United States Patent [19]

Ikeda

[11] 4,177,449
[45] Dec. 4, 1979

[54] PHOTOELECTRIC CONVERTER APPARATUS

[75] Inventor: Takatoshi Ikeda, Yokohama, Japan

[73] Assignee: Hitachi, Ltd., Japan

[21] Appl. No.: 871,808

[22] Filed: Jan. 24, 1978

[30] Foreign Application Priority Data

Jan. 27, 1977 [JP] Japan .................................. 52-8075

[51] Int. Cl.² ............................................. G06K 9/00
[52] U.S. Cl. ......................... 340/146.3 AG; 250/567; 358/285
[58] Field of Search ............. 340/146.3 AG; 250/205, 250/567, 568, 216; 358/285

[56] References Cited

U.S. PATENT DOCUMENTS

| 2,943,208 | 6/1960 | Shepard et al. | 340/146.3 AG |
| 3,379,826 | 4/1968 | Gray | 340/146.3 AG |
| 3,472,958 | 10/1969 | Estock | 340/146.3 AG |
| 3,593,284 | 7/1971 | Frank et al. | 340/146.3 AG |

Primary Examiner—Leo H. Boudreau
Attorney, Agent, or Firm—Craig and Antonelli

[57] ABSTRACT

A photoelectric converter apparatus suited for use in optical pattern reader system comprises a plurality of charge storage type photoelectric conversion elements disposed in a linear array for receiving light reflected from an original such as slip or a bill carrying characters, figures or the like, and storing quantities of electric charges in proportional dependence on the intensity of the reflected light. An additional photoelectric conversion element is also provided for receiving light from a light source illuminating the original and converting the received light into a corresponding electrical signal which is integrated in synchronism with the initiation of the charge storage of the charge storage type photoelectric conversion element assembly. When the integrated signal value has attained a predetermined level, the stored charges are outputted from the charge storage type photoelectric conversion elements. Thus, a stabilized output signal can be obtained even when the luminance of the used light source undergoes variation, because the stored charges are outputted only when the quantity of irradiation light has attained a predetermined reference value. The photoelectric converter apparatus can be implemented in a simple structure.

16 Claims, 6 Drawing Figures

PHOTOELECTRIC CONVERTER APPARATUS

LIST OF PRIOR ART REFERENCE (37 CFR 1.56 (a))

The following reference is cited to show the state of the art:

Technical Data Sheet for Fairchild Model No. CCD131 1024-element linear image sensor, charge coupled device, dated March 1976

BACKGROUND OF THE INVENTION

1. Field of the Invention

The present invention relates to an apparatus for reading an original such as characters, figures or the like and converting it into corresponding electrical signals. In particular, the invention concerns a photoelectric converter apparatus suited for use in a pattern reader system in which an original such as a slip, bill or the like carrying thereon pattern information such as characters, figures or the like is irradiated with light from a light source, and the reflected light from the irradiated original is converted into electric signals representing the pattern information.

2. Description of the Prior Art

In systems such as facsimiles and OCR's (optical character readers) conversion of pattern information such as characters, figures or the like into corresponding electrical signals is performed. Photoelectric conversion elements of a charge storage type and adapted to constitute the photoelectric converter apparatus for the pattern reader for converting the patterns of characters, figures or the like into corresponding electric signals. Typically, the charge storage type photoelectrical conversion element consists of a photodiode in which electric charge is stored under irradiation with light.

Such pattern reader system generally include a light source for projecting light to an original such as slip, bill or the like carrying thereon alphanumeric characters, figures or the like, a pattern reader apparatus comprising a photoelectric conversion apparatus having a plurality of charge storage type photodiodes arrayed in a linear row, and a reading circuit for reading out sequentially electric charges stored in the individual photodiodes.

Reflected light from the original which is irradiated with light from the light source, is collected through a collector lens and applied to the photodiodes of the photoelectric converter apparatus. After a predetermined time duration has elapsed, the stored charges are outputted to the reading circuit. This process is repeated many times while the original being progressively moved.

Since the quantity of light reflected from blank or white portions of the original is large, the quantity of electric charge stored in the photodiodes which are positioned opposite to the white portions will be correspondingly large. On the contrary, the quantity of stored charge in the photodiodes facing toward the black portions of the original will be small. In this manner, electrical signal representing the lights and shades of the original can be obtained. An electrical signal of an analog nature thus obtained may be processed as it is. However, it is common to convert it into digital signal of logic "1" and "0" through comparison with a threshold reference.

A fluorescent lamp is well suited to be used as the light source for the pattern reader system in view of a high light emission efficiency, an advantageous geometrical configuration for illuminating the original over the whole width thereof, and the possibility of assuring a relatively uniform sensitivity for the individual photodiodes constituting the photoelectric converter apparatus. On the other hand, the fluorescent lamp suffers from such drawbacks that the luminance thereof is likely to undergo influences of variations in the source voltage, the ambient temperature and the illuminating duration. For example, the luminance of the fluorescent lamp will vary remarkably for several minutes after the initial firing. In reality, the ratio of the maximum luminance to the minimum luminance over the use life will amount to about 3 or 4. Such variation in luminance will give rise to an excursion in the output signal level of the photoelectric converter apparatus as a function of time and eventually involve erroneous pattern reading.

Heretofore, several attempts have been made to prevent the variation in the luminance of fluorescent lamps with a view to attaining a stabilized output from the photoelectric converter apparatus. One known method resides in the provision of a light intensity regulator system according to which the luminance of the light source of fluorescent lamp is detected to produce a control signal for controlling the voltage of a power supply source for the lamp through a feedback loop so that the luminance of the lamp may be maintained essentially constant. According to another known method, the charge signal from the photoelectric converter apparatus is amplified in the reading circuit with the gain varied in conformance with the variation in the luminance of the light source, thereby to attain a constant output level of the pattern reader apparatus. However, since the fluorescent lamp is generally energized from an a.c. source such as a commercial power line, the luminance of the lamp can not avoid a pulsating variation synchronized with the cycle of the alternating voltage. Under such circumstances, the circuitry required for carrying out the known control methods described above has to be operated in synchronism with the pulsation of source voltage, which of course involves much a complicated and expensive circuit configuration.

As another attempt, it is also known to change over the charge storing duration of the photodiodes. More specifically, a plurality of different charge storing durations corresponding to n.T where n represents an integer and T represents a period of a.c. source voltage, are previously made to be available for the photodiodes and selectively changed over in dependence on the luminance of fluorescent lamp. For example, two kinds of charge storing durations twice and three times as long as a period of the a.c. source voltage are made available for the photodiodes of the photoelectric converter apparatus. When the luminance of light source is high, the photodiodes are allowed to store electric charge for duration twice as long as a period of the a.c. source voltage. On the other hand, when the luminance of lamp is low, i.e. the photodiodes store electric charge at a relatively low rate, the longer storage duration of three times as long as a period of a.c. voltage is used. After the selected duration has elapsed, the stored charge is transferred to the reading circuit. In this manner, protection is obtained against the occurrence of remarkable difference in the output level of a the reader circuit.

The reason why the charge storing duration must have lengths equal to a period of a.c. source voltage multiplied by integers can be explained by the fact that the storage of charge can then be initiated at any phase position of the pulsating cycle of the luminance without incurring inconsistency in the quantity of stored charge in the photodiodes.

The above known method is, however, disadvantageous in that the output level of the reading circuit will undergo an abrupt change immediately after the charge storing duration has been changed over, which will eventually result in an erroneous pattern reading.

SUMMARY OF THE INVENTION

An object of the invention is to provide a photoelectric converter apparatus which assures a stable output level regardless of variations in the luminance of a light source.

Another object of the invention is to provide a photoelectric converter apparatus which can exhibit a stabilized output level with a simplified and inexpensive arrangement.

In view of the above objects, there is proposed according to an aspect of the invention a photoelectric converter apparatus which comprises a plurality of charge storage type photoelectric conversion elements adapted to receive light rays reflected from an original such as a slip carrying pattern information, and to store electric charges in dependence on the quantity of received light. An additional photoelectric conversion element is also provided which is adapted to initiate conversion of light from the light source illuminating the original into an electrical signal in synchronism with the initiation of the charge storage by the array. The apparatus further includes an integrating circuit for integrating the electric signal, and a comparator circuit for comparing the output from the integrating circuit with a predetermined reference level to produce a readout signal to transfer the stored charges to a reading circuit upon coincidence between the integrated value and the reference level. With such an arrangement, a constant output level can be attained independently of variation in the luminance of the light source with a simple structure.

DETAILED DESCRIPTION OF THE PREFERRED EMBODIMENTS

Figure 1:
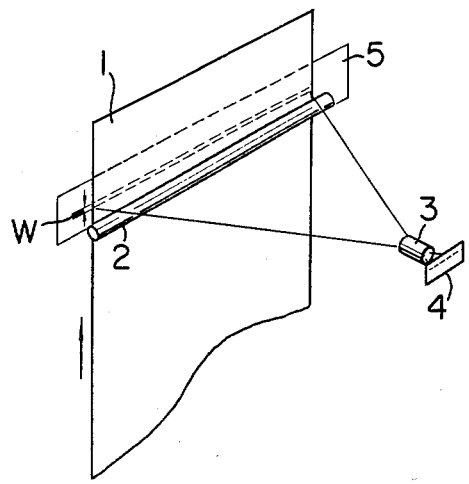
FIG. 1 schematically shows an arrangement of a pattern reader system.

Referring to FIG. 1 which shows schematically a pattern reader apparatus, reference numeral 1 denotes an original such as a slip, a bill or the like which carries characters and/or figures to be read and is moved upwardly as indicated by an arrow. A fluorescent lamp 2 serves as a light source for illuminating the original 1. Light reflected from the original 1 is collected by a collector lens 3. A pattern reader apparatus 4 includes a photoelectric conversion apparatus provided with a plurality of photoelectric conversion elements of a charge storage type arrayed in a row and a reading circuit. A stripe-like line region of a predetermined width w of the pattern on the original 1 is registered in the photoelectric converter apparatus as electric charges stored in the individual photoelectric conversion elements with the quantities of stored charges being different from one element to other in dependence on the lights and shades of the pattern (difference in reflection factor of light). The charges stored in the photoelectric elements of the charge storage type are read out from these elements with appropriate time intervals for further processing or utilization. Such a process is repeated as the original 1 is fed past the pattern reader.

The electric charges read out from the photoelectric conversion elements are converted into corresponding voltages and amplified. The amplified voltages are then compared with a predetermined threshold or reference level to be converted into digital information such as logic "1" and "0".

A reflection mirror 5 is positioned behind the original 1 and serves for increasing the quantity of light particularly when the original 1 is very thin.

Figure 2:
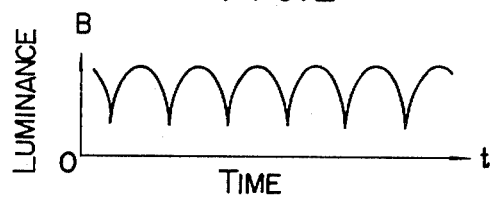
FIG. 2 graphically illustrates variation of luminance of the a typical light source employed in the pattern reader system.

FIG. 2 illustrates graphically the variation in luminance of a fluorescent lamp used as the light source 2. As can be seen from the figure, the luminance B will pulsate in timing with the period of an a.c. power source for energizing the lamp 2, and undergo variations in dependence on the lighting duration t or other factors.

Figure 3:
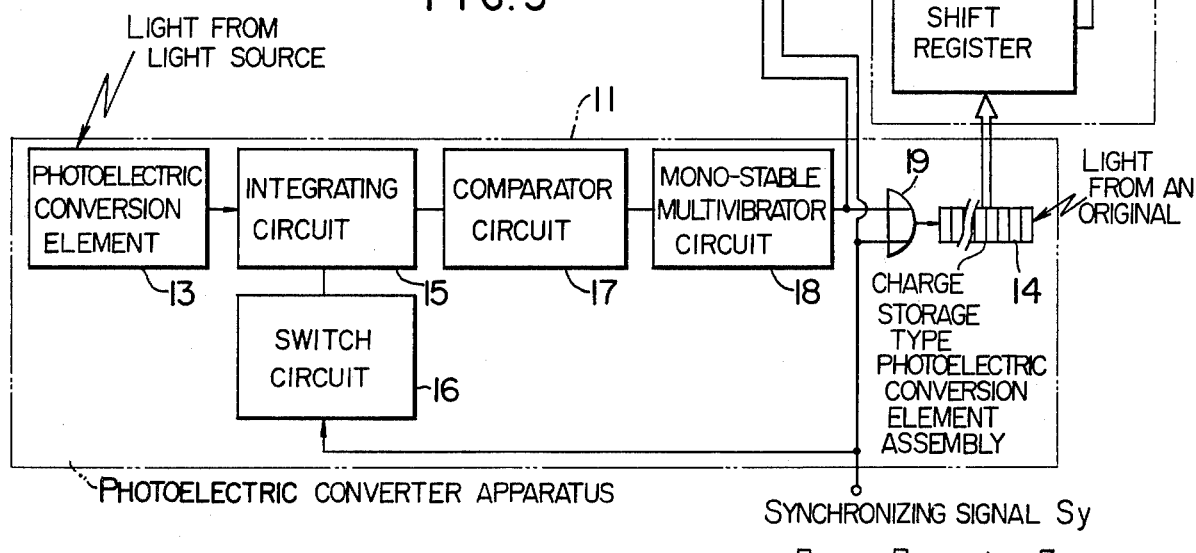
FIG. 3 is a block diagram showing an embodiment of a photoelectric converter apparatus according to the invention.

FIG. 3 shows schematically an embodiment of the photoelectric converter apparatus according to the invention. The photoelectric conversion apparatus denoted generally by reference numeral 11 includes additionally a photoelectric conversion element 13 for detecting the quantity of light emitted from the light source. This photoelectric conversion element 13 is destined to receive light straight-forwardly from the light source used for emitting light for illuminating the original 1 and the reflection image of which is received by the charge storage type photoelectric conversion element assembly 14. However, the light as received by the photoelectric conversion element 13 is not reflected from the original, but rather it is the light emitted directly from the light source or the reflected light from the mirror 5. In other words, the light illuminating the photoelectric element 13 must represent the luminance of the light source without being subjected to influences of the lights and shades of characters and/or figures on the original 1. Further, the photoelectric conversion element 13 should desirably have the same spectral sensitivity as the charge storage type photoelectric element assembly 14.

The output signal from the photoelectric conversion element 13 is integrated by an integrating circuit 15. A switch 16 is turned on in response to a synchronizing signal thereby to discharge the electric charge accumulated in the integrating circuit 15 and reset it to initial state corresponding to a zero level. A comparator 17 functions to compare the accumulated charge in the integrating circuit 15 with a predetermined reference level or value and produce a coincidence signal upon the occurrence of coincidence between the integrated quantity of charge and the reference value. A mono-stable multivibrator 18 responds to the coincidence signal to produce a one-shot pulse.

The charge storage type photoelectric conversion element assembly 14 is composed of individual charge storage type photoelectric conversion elements arrayed in a row. Each of these elements 14 are adapted to receive light reflected from the original and to store a quantity of charge in dependence on the quantity of light received. Charges stored in the individual charge storage photoelectric conversion elements 14 are transferred to a shift register 20 of a reading circuit 12 in response to a signal fed through an OR gate 19.

Next, description will be made on the operation of the photoelectric converter apparatus 11. The integrating circuit 15 and the charge storage photoelectric conversion element assembly 14 are reset to the initial states corresponding to the integrated value of zero and the stored charge of zero, respectively, through periodic synchronizing signals, and begin to perform the integrating operation and the storage of charge. When the integrated value has attained a predetermined value, a one-shot pulse is outputted from the mono-stable multivibrator 18 and applied to the charge storage photoelectric conversion element assembly 14 through the OR gate 19, whereby the stored charges are transferred to the shift register 20.

As will be appreciated from the above description, the fact that the integrated value of the integrating circuit 15 has attained a predetermined value will mean that the photoelectric conversion element 13 has received a predetermined quantity of light independently of any possible variations in the luminance of the light source. Further, since the charge storage photoelectric conversion element assembly 14 begins to store electric charge simultaneously with the photoelectric conversion element 13, and outputs the stored charge at the time when the integrated level of the output signal from the photoelectric conversion element 13 has attained the predetermined value, the output from the charge storage photoelectric conversion element assembly 14 is insusceptible to any possible variations in the luminance of the light source. In other words, the photoelectric converter apparatus according to the invention exhibits an unvarying output level notwithstanding any variation in the luminance of the light source.

With the arrangement of the photoelectric converter apparatus described above, it is possible to begin the charge storage and output the stored charge at any phase positions of the pulsating luminance curve shown in FIG. 2 without involving any variation in the output level from the converter apparatus.

The reading circuit 12 is adapted to send out the charge signals from the photoelectric converter apparatus 11 in a serial form.

The charge signals output in parallel from the charge storage photoelectric conversion element assembly 14 of the photoelectric converter apparatus 11 are stored in the shift register 20. A flip-flop 21 is provided which is set by the output from the mono-stable multivibrator 18 thereby to enable the AND gate 22. Shift pulses $S_p$ are applied to the shift register 20 at the terminal 23, whereby the contents in the shift register 20 is sequentially fed out through the AND gate 22. The flip-flop 21 is reset by the synchronizing signal. As the shift register for transferring the charge signals, a charge coupled device or CCD may be usually employed. The reading circuit 12 may be of the hitherto known circuit configuration.

The quiescent time interval of the synchronizing signal $S_y$ is selected to be sufficiently long for the photoelectric converter apparatus to receive sufficient quantity of light reflected from the original notwithstanding variation in the luminance of the light source and send out information of stored charges in response to the shift pulses $S_p$. Also, the speed at which the original is moved is selected such that the original is fed for a distance which allows analysis of the image to be carried out during the charge storing phase.

Figure 4:
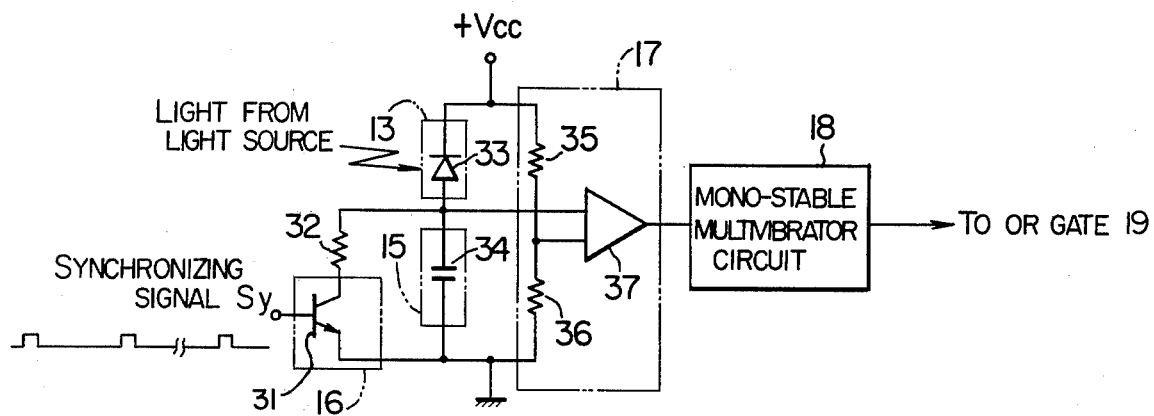
FIG. 4 is a circuit diagram showing in detail a circuit configuration of a circuitry employed in the photoelectric converter apparatus shown in FIG. 3.

FIG. 4 shows in detail a circuit portion of the photoelectric converter apparatus shown in FIG. 3 which incarnates the teachings of the invention. This circuitry includes the photoelectric conversion element 13, the integrating circuit 15, the switch circuit 16, the comparator circuit 17 and the mono-stable multi-vibrator 18.

As can be seen from FIG. 4, a series connection of a photodiode 33 and a capacitor 34 is connected in parallel with the series connection of resistors 35 and 36. A bias voltage $V_{cc}$ is applied to this circuitry. The capacitor 34 is connected in parallel with a series connection of a transistor 31 and a resistor 32. One input terminal of the comparator circuit 37 is connected to a junction between the capacitor 34 and the photodiode 33, while the other input terminal of the comparator 37 is connected to a junction between the resistors 35 and 36. When the photodiode 33 is irradiated with light, the conductivity thereof is varied in dependence on the intensity of the light and a corresponding quantity of charge is stored in the capacitor through the photodiode 33. The resistors 35 and 36 constitutes a voltage divider for the bias voltage $V_{cc}$ to establish a reference voltage. When the voltage appearing across the capacitor 34 coincides with the reference voltage, the coincidence signal is produced from the comparator circuit 37 and fed to the mono-stable multivibrator 18. The synchronizing signal $S_y$ is applied to the base of transistor 31 which will then become conductive, thereby to short-circuit the capacitor 34 to discharge completely the stored charge therefrom. The resistor 32 serves to protect the transistor 31 from being damaged or destroyed by possible surge current.

Referring also to FIGS. 3 and 4, the transistor 31 corresponds to the switch circuit 16 and the capacitor 34 corresponds to the integrating circuit 15, while the comparator 37 with the resistors 35 and 36 corresponds to the comparator circuit 17.

Figure 5:
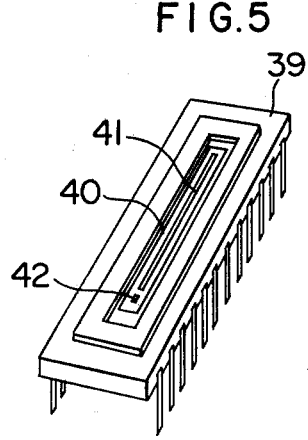
FIG. 5 shows in a perspective view an assembled photoelectric converter apparatus.

FIG. 5 is a perspective view showing a charge storage type photoelectric converter apparatus according to the invention. A chip 40 of the charge storage photoelectric conversion element assembly implemented in a semiconductor integrated circuit is contained in a dual in-line package 39 having a glass window. There are provided on the chip 40 the charge storage photoelectric conversion element array 41 and a photodiode 42 serving as the photoelectric conversion element 13. In assembling the converter apparatus into a reader apparatus, the charge storage photoelectric conversion element array 41 is located at a position to be illuminated with light reflected from the original 1 shown in FIG. 1, while the photodiode 42 is positioned so as to receive the light reflected in the mirror 5. With such an arrangement, the structure of the photoelectric converter apparatus can be simplified. Although the charge storage photoelectric conversion element array 41 and the photoelectric conversion element consisting of the photodiode 42 are provided separately in the structure described above, it is of course possible to use one or more charge storage type photoelectric conversion elements located at an end portion of the array 41 as the photoelectric conversion element 13 for receiving straight-forwardly the light from the light source thereby to obviate the need for the photodiode 42.

Figure 6:
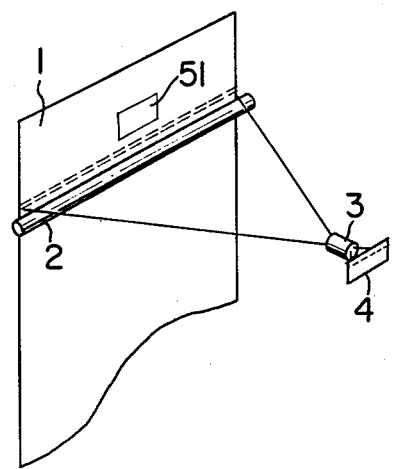
FIG. 6 shows schematically another embodiment of the invention.

FIG. 6 shows schematically another embodiment of the photoelectric converter apparatus according to the invention which differs from the arrangement shown in FIG. 5 in that the photodiode 42 is disposed at a position offset vertically from the charge storage type photoelectric conversion element array 42. The reflecting mirror 51 is also located at a fixed position offset vertically from the reading position of the original 1.

In the above description, it has been assumed that the photoelectric conversion element 13 or photodiode 42 is adapted to receive the light reflected in a mirror. However, this element may be positioned so as to receive directly the light from the light source. Furthermore, the element 13 or 42 may be located in the vicinity of the light source to directly receive the light without interposition of the collector lens.

I claim:

1. A photoelectric converter apparatus for reading information contained on an original information containing copy comprising:
   a plurality of first photoelectric conversion elements disposed in an array for receiving light carrying image information to be read out of said original copy, said conversion elements each being of the charge storage type and adapted to store an amount of electric charge which is proportional to an intensity of said image information carrying light;
   a second photoelectric conversion element for receiving light carrying luminance information of an external light source irradiating said original copy and for converting said luminance information carrying light into an electrical signal;
   means for selectively transmitting a read-out signal to said first photoelectric conversion elements, said read-out signal transmitting means comprising a circuit for storing said electrical signal from said second photoelectric conversion element and means for producing said read-out signal when an output of said storing circuit reaches a predetermined reference level; and
   means for reading out electric charges stored in said first photoelectric conversion elements by an external first clock signal in response to said read-out signal.

2. A photoelectric converter apparatus as claimed in claim 1, wherein said circuit for storing said electrical signal comprises an integrating circuit.

3. A photoelectric converter apparatus as claimed in claim 2, wherein said read-out signal transmitting means further comprises means responsive to an external second clock signal for setting said integrating circuit at an initial integration value in synchronism with the initiation of charge storage of said first photoelectric conversion elements.

4. A photoelectric converter apparatus as claimed in claim 2, wherein said read-out signal producing means comprises a comparator circuit for producing a coincidence signal when said integrated value reaches a predetermined reference level and a monostable multivibrator circuit for producing said read-out signal to said coincidence signal.

5. A photoelectric converter apparatus as claimed in claim 4, wherein the second photoelectric conversion element has the same spectral sensitivity as said first photoelectric conversion elements.

6. A photoelectric converter apparatus for reading information contained on an original information containing copy which is illuminated by a light source of varying intensity, comprising:
   a plurality of first photoelectric conversion elements disposed in an array for receiving light carrying information to be read out of said original copy, said conversion elements each being of the charge storage type and adapted to store an amount of electric charge which is proportional to the intensity of said image information carrying light, wherein said image information carrying light is obtained from reflection of the varying intensity light source off of said original copy so that the intensity of said image information carrying light varies in accordance with the intensity variation of said light source;
   a second photoelectric conversion element for receiving light from said varying intensity light source which has not been reflected off of said original copy, and for converting said light into an electrical signal;
   means for selectively transmitting a read-out signal to said first photoelectric conversion elements, said read-out transmitting means comprising a circuit for storing said electrical signal from said second photoelectric conversion element and means for producing said read-out signal when an output of said storing circuit reaches a predetermined reference level corresponding to a predetermined total quantity of light illumination of said original copy by said varying intensity light source; and
   means for reading out electric charges stored in said first photoelectric conversion elements by an external first clock signal in response to said read-out signal.

7. A photoelectric converter apparatus as claimed in claim 6, wherein said circuit for storing said electrical signal comprises an integrating circuit.

8. A photoelectric converter apparatus as claimed in claim 6, wherein said read-out signal transmitting means further comprises means responsive to an external second clock signal for setting said integrating circuit at an initial integration value in synchronism with the initiation of charge storage of said first photoelectric conversion elements.

9. A photoelectric converter apparatus as claimed in claim 6, wherein said read-out signal producing means comprises a comparator circuit for producing a coincidence signal when said integrated value reaches a predetermined reference level and a monostable multivibrator circuit for producing said read-out signal to said coincidence signal.

10. A photoelectric converter apparatus as claimed in claim 6, wherein the second photoelectric conversion element has the same spectral sensitivity as said first photoelectric conversion elements.

11. A photoelectric converter apparatus as claimed in claim 6, wherein said varying intensity light source is a fluorescent lamp.

12. A photoelectric converter apparatus for reading information contained on an original information containing copy, comprising:
- a plurality of first photoelectric conversion elements disposed in an array for receiving light carrying image information to be read out of said original copy, said conversion elements each being of a charge storage type and adapted to store an amount of electric charge which is proportional to an intensity of said image information carrying light;
- a second photoelectric conversion element for receiving light carrying luminance information of an external light source irradiating said original copy and for converting said luminance information carrying light into an electrical signal; and
- means for selectively transmitting a read-out signal to said first photoelectric conversion elements in accordance with said electrical signal from said second photoelectric conversion element and an external synchronizing signal, so that the electric charges stored in said first photoelectric conversion elements are outputted in response to said read-out signal, wherein said read-out signal transmitting means comprises:
- an integrating circuit for integrating said electrical signal from said second photoelectric conversion element;
- means responsive to said synchronizing signal for setting said integrating circuit at an initial integration value in synchronism with initiation of charge storage of said first photoelectric conversion elements;
- a comparator circuit including means for holding a predetermined reference level and means for producing a coincidence signal when said integrated value coincides with said predetermined reference level; and
- a mono-stable multivibrator circuit for producing said read-out signal in response to said coincidence signal.

13. A photoelectric converter apparatus as claimed in claim 12, wherein said image information carrying light is light reflected from said original copy.

14. A photoelectric converter apparatus as claimed in claim 12, wherein said integrating circuit comprises a capacitor connected in series with said second photoelectric conversion element and supplied with said electrical signal therefrom, said integrating circuit setting means comprises a transistor having the collector-emitter circuit connected in parallel with said capacitor and the base supplied with said synchronizing signal, and said reference level holding means comprises two series-connected resistors for dividing a voltage of an external voltage source.

15. A photoelectric converter apparatus as claimed in claim 12, wherein said first photoelectric conversion elements are implemented in a form of a semiconductor integrated circuit in which said elements are arrayed in a linear alignment with one another, and said second photoelectric conversion element is formed in a chip of said semiconductor integrated circuit and is disposed in a linear alignment with said first photoelectric conversion elements.

16. A photoelectric converter apparatus as claimed in claim 12, wherein said second photoelectric conversion element is adapted to receive said luminance signal carrying light reflected by an external reflecting mirror.

* * * * *